US007784430B1

(12) United States Patent
Thorne et al.

(10) Patent No.: US 7,784,430 B1
(45) Date of Patent: Aug. 31, 2010

(54) PLASTIC PET DOOR ASSEMBLY

(76) Inventors: David Thorne, 21164 Escondido St., Woodland Hills, CA (US) 91364; Thomas E. Schroy, 26119 San Canyon Rd., Canyon Country, CA (US) 91387

( * ) Notice: Subject to any disclaimer, the term of this patent is extended or adjusted under 35 U.S.C. 154(b) by 816 days.

(21) Appl. No.: 11/434,705

(22) Filed: May 16, 2006

Related U.S. Application Data

(60) Provisional application No. 60/681,688, filed on May 16, 2005.

(51) Int. Cl.
*A01K 1/03* (2006.01)

(52) U.S. Cl. ....................................... 119/484; 119/501

(58) Field of Classification Search ................. 119/484, 119/481, 501; 49/381; 160/181, 90, 92
See application file for complete search history.

(56) References Cited

U.S. PATENT DOCUMENTS 3,690,299 A * 9/1972 Johnson ...................... 119/174
4,043,079 A * 8/1977 Smith .......................... 49/394
4,760,872 A * 8/1988 Hale, Jr. ...................... 160/90
5,546,895 A * 8/1996 Brown ........................ 119/484
5,649,500 A * 7/1997 Klavemann et al. ......... 119/452
6,453,847 B2 * 9/2002 Brooks ....................... 119/484
6,691,463 B1 * 2/2004 Richmond ................... 49/360
2002/0011217 A1 * 1/2002 Brooks ....................... 119/481
2005/0039694 A1 * 2/2005 Johnson ...................... 119/501
2005/0284402 A1 * 12/2005 Becker ....................... 119/484
2007/0089684 A1 * 4/2007 Brooks et al. ............... 119/484
2008/0184625 A1 * 8/2008 Bjorholm et al. .............. 49/371
2008/0184940 A1 * 8/2008 Bosserdet et al. ........... 119/484

* cited by examiner

*Primary Examiner*—Yvonne R. Abbott
(74) *Attorney, Agent, or Firm*—Law Offices of David L. Hoffman

(57) ABSTRACT

A door section for fitting in a sliding door frame is preferably made of plastic, e.g., PVC. The door section contains a built in pet door. The door section is formed by tubular sides and cross members, and has plastic brackets that press fit within the tubular members and preferably also may be screwed in place, or otherwise fixed in place, e.g., using epoxy, or both screws and epoxy. The door section has brackets on its side edges for hanging or connecting to the inside of the sliding door frame, and the door section may also have a bracket or catch on the other side edge from which the door section connects to the frame. This bracket or catch is for the existing sliding door's lock. Preferably, insulation strips are provided and preferably an H-shaped vertical section may fit on top of the door section and inside the frame for a fit with less play, and for a smoother or cleaner look. Rubber or rubbery elements may be placed over the sliding door's bottom track, for the door section to sit more securely. The door section preferably also has a glass or other clear material in it above the pet door.

25 Claims, 13 Drawing Sheets

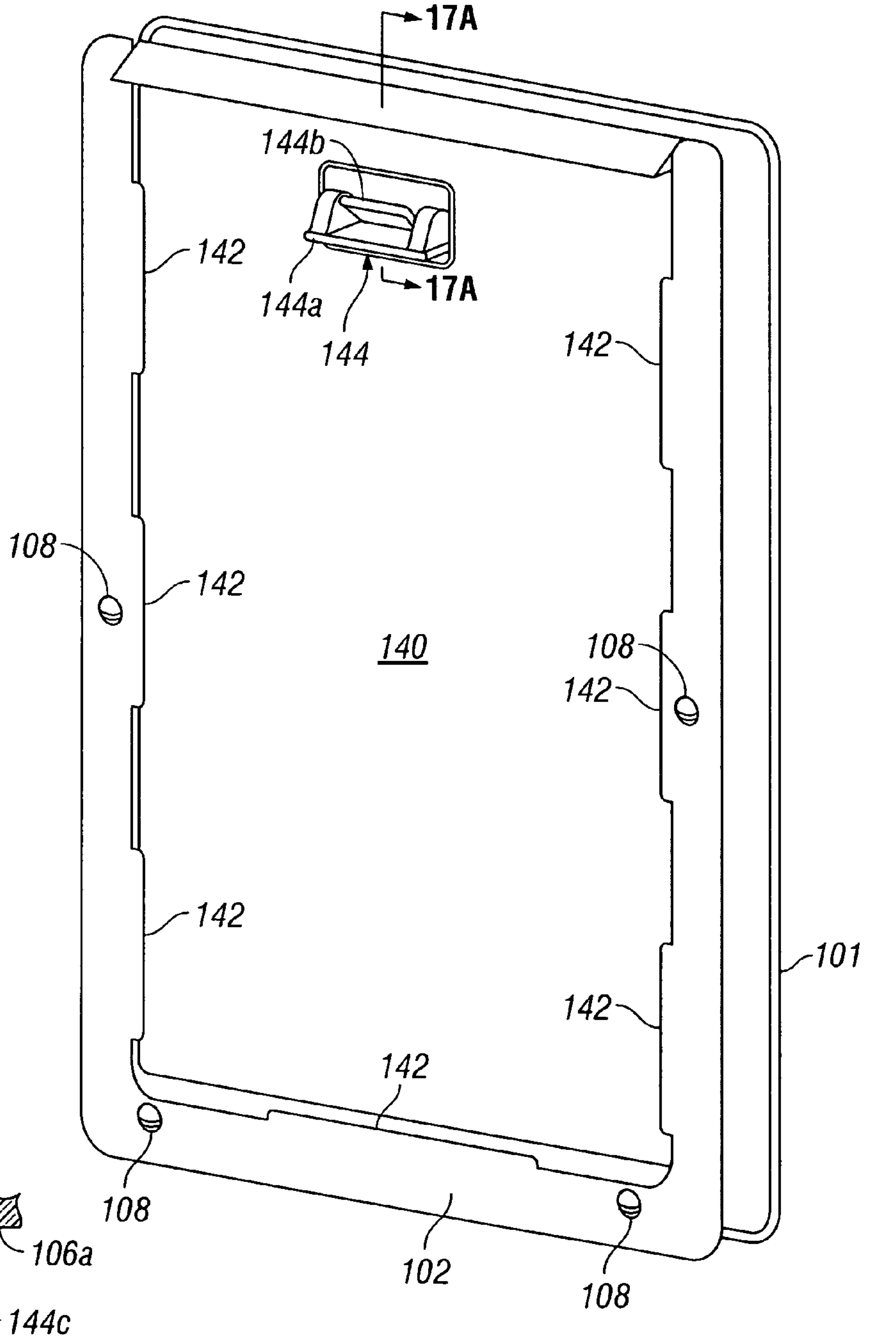
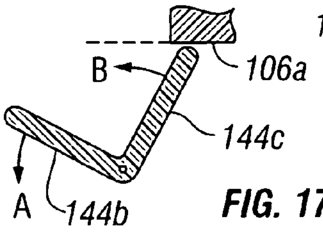
FIG. 17A
FIG. 17

PLASTIC PET DOOR ASSEMBLY

CROSS REFERENCE TO RELATED APPLICATION(S)

This application claims priority from U.S. Provisional Patent Application Ser. No. 60/681,688, filed May 16, 2005, by the same inventive entity, and which is incorporated by reference herein.

BACKGROUND OF THE INVENTION

1. Field of the Invention

The present invention relates to a pet door, and in particular, a pet door having multiple horizontally hinged or pivotable flap sections, and also, a plastic door section containing a pet door for installation in a sliding door.

2. Description of the Related Art

Pet doors have been used for quite a long time. Some are installed in walls, some in solid doors, and some in panels that fit in screen or sliding doors. Typical pet doors have a frame or jamb, and a pivotable flap which swings in or out. To get outside, the dog or animal simply walks into the flap and continues walking. The flap rotates upward as the dog pushes on the flap, thus opening the door. The dog may go back through the door to get inside by using the same technique. This time the door will pivot upward in the opposite direction to the way it pivoted when the dog went outside.

The typical flap is a single plastic or vinyl sheet, which is usually rigid. A problem can occur if a dog starts to walk through, and then changes its mind and tries to go backward. The dog can wedge its legs between the door frame and the plastic flap.

The typical flap also does not always return to the center and sealed position in the door, and is not well insulated, and has edges that can hurt a dog because of its rigidity.

Another problem with pet doors is locating them. Often it is undesirable to mount them in a wall, because that may require drywall repair, painting and possibly other work. Pet doors are sometimes sold pre-mounted in a sliding door insert, i.e., a segment of door that forms part of a sliding door. Examples of this type of pet door structure are shown in U.S. Pat. Nos. 5,551,188 to Davlantes, 3,811,224 to Garrison, 5,946,855 to Miconi, 3,654,733 to Blackwell, 6,691,483 to Lethers, 3,464,158 to Greene, and 5,185,954 to Waddle, Sr. Such doors can require cumbersome mounting or can look unsightly. In addition, they tend to be heavy.

What is needed is an aesthetically pleasing door segment that has a built in pet door, which is lightweight yet strong, easy to install, and universally fits into most or all sliding doors.

SUMMARY OF THE INVENTION

In one preferred embodiment, a door section for fitting in a sliding door frame is preferably made of plastic, e.g., PVC. The door section contains a built in pet door. The door section is formed by tubular sides and cross members, and has plastic brackets that press fit within the tubular members and preferably also may be screwed in place, or otherwise fixed in place, e.g., using epoxy, or both screws and epoxy. In addition, the door section has brackets on its side edges for hanging or connecting to the inside of the sliding door frame, and the door section may also have a bracket or catch on the other side edge from which the door section connects to the frame. This bracket or catch is for the existing sliding door's lock. Preferably, insulation strips are provided and preferably an H-shaped vertical section may fit on top of the door section and inside the frame for a fit with less play, and for a smoother or cleaner look. In addition, rubber or rubbery elements may be placed over the sliding door's bottom track, for the door section to sit more securely. The door section preferably also has a glass or other clear material in it above the pet door.

In another preferred embodiment, a pet door has multiple sections that make up a flap, and each section is hinged horizontally across the top to the section above it. The topmost section is hinged to the top of the frame. In a preferred embodiment, the pet door has three sections. Depending upon the size of the door and the size of the sections, other embodiments may have two sections or four or more sections.

Each section is preferably constructed in two pieces which fit together, and trap a portion of a rubber strip, which rubber strip operates as a hinge. Thus, the sections may be hinged to each other, or to the top of the door frame. With this construction, the multi-sectioned flap moves up and out of the way, with each section rotating up and out of the way. The multiflap structure enables the door section(s) to take up very little room when a dog passes through them. In addition, because the door is in sections, injuries to the pet are minimized. The sectioned door will be more forgiving when pets pass through the door.

BRIEF DESCRIPTION OF THE DRAWINGS

FIG. 17 is a side view of a door with a spring lock for the pet door of FIG. 1 or FIGS. 15A, 15B and 16;

FIG. 17A is a sectional view taken along line 17A-17A of FIG. 17;

DESCRIPTION OF THE PREFERRED EMBODIMENT(S)

Figure 1:
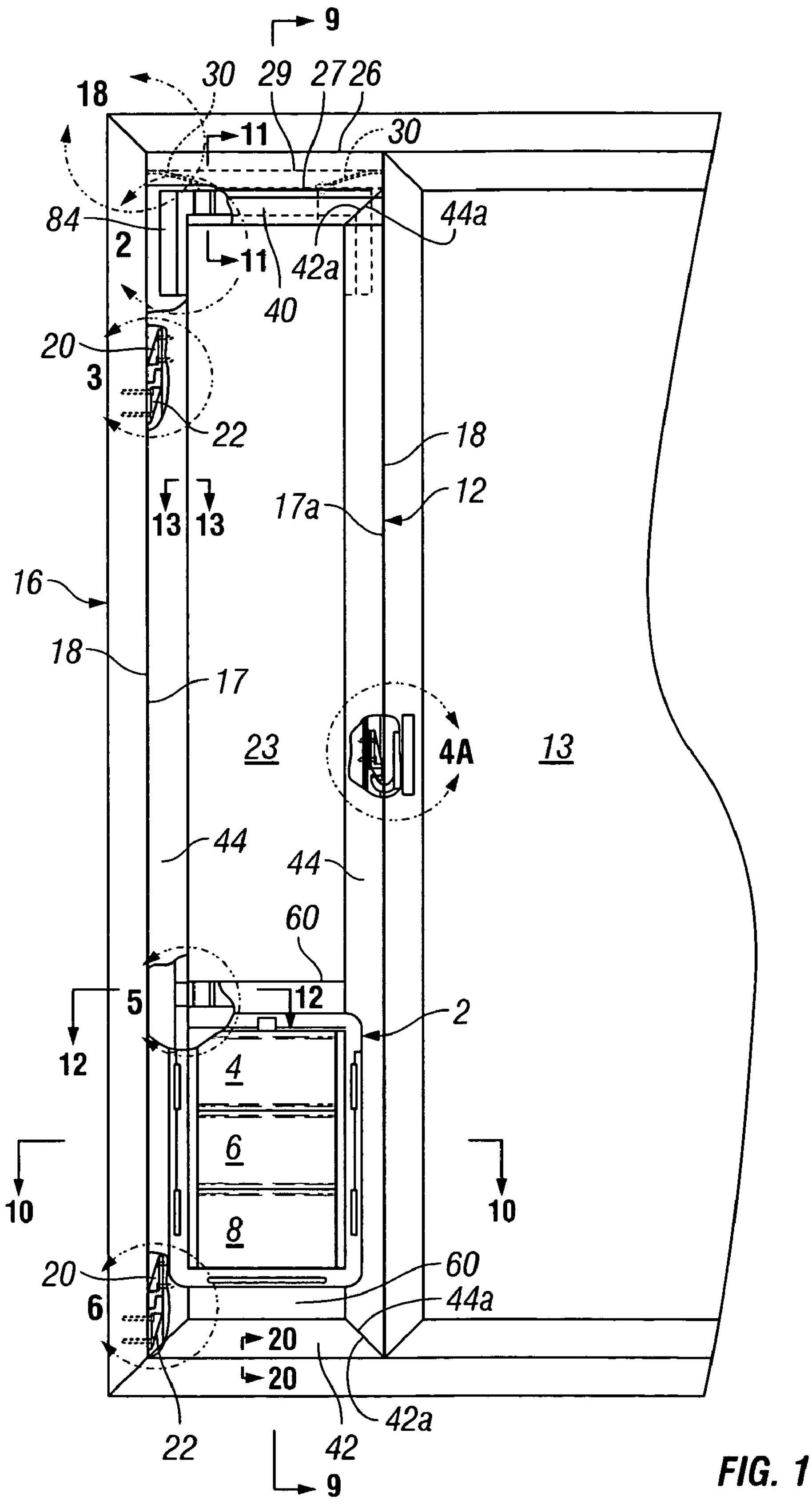
FIG. 1 is a side elevation, partial cutaway view of a door section installed in a sliding door frame, and having a pet door installed in the door section, in accordance with a first embodiment of the invention.

In one preferred embodiment, as shown in FIG. 1, a pet door 2 has multiple sections 4, 6, 8 that make up a flap 10. Each section 4, 6, 8 is hinged horizontally across the top to the section above it.

In FIG. 1, a door section 12 for installation in a sliding door has a pet door 2 incorporated within. The pet door also may be installed in a wall, a regular door, or other barrier where pet passage back and forth is desired.

In another preferred embodiment, door section 12 of FIG. 1 is a vinyl or plastic such as PVC (polyvinylchloride). The door section fits into a jamb or frame of a sliding door. In this embodiment, door section 12 can have any type of pet door in it. It need not be pet door 2.

Door Section

Figure 14:
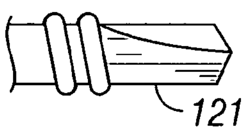
FIG. 14 is a side view of a portion of a self-tapping screw for use in the door section of FIG. 1.
Figure 14A:
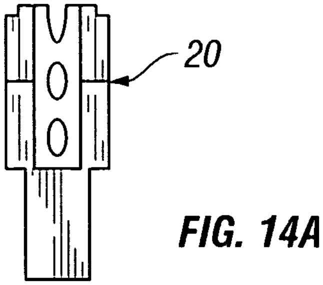
FIG. 14A is a side view of a hanging or mounting bracket used in mounting the door section of FIG. 1.

The door section 12 fits into many different sliding door frames. An exemplary frame 16 is shown in FIG. 1. Section 12 fits in frame 16 in a unique way. Preferably, section 12 has a symmetrical structure, such that either side edge 18 may have a first bracket or brackets 20 (or upper bracket) screwed, bolted or otherwise affixed to the door section side edge. In FIG. 1, the left side edge 18 of the door section has two upper brackets 20 affixed thereto. In a more preferred embodiment, both left and right side edges 18 each have upper brackets 20 affixed thereto. A side view of the upper brackets 20 is shown in FIG. 14A. Each bracket preferably has oval screw holes for adjustability. In the door section, standard screws may be used. It is preferable to use self-tapping screws 121, which have their ends formed somewhat like a drill bit, as is well known in the fastener art. Therefore, the screws 121 will bore through the PVC or plastic without using a drill, further simplifying installation.

Figure 3:
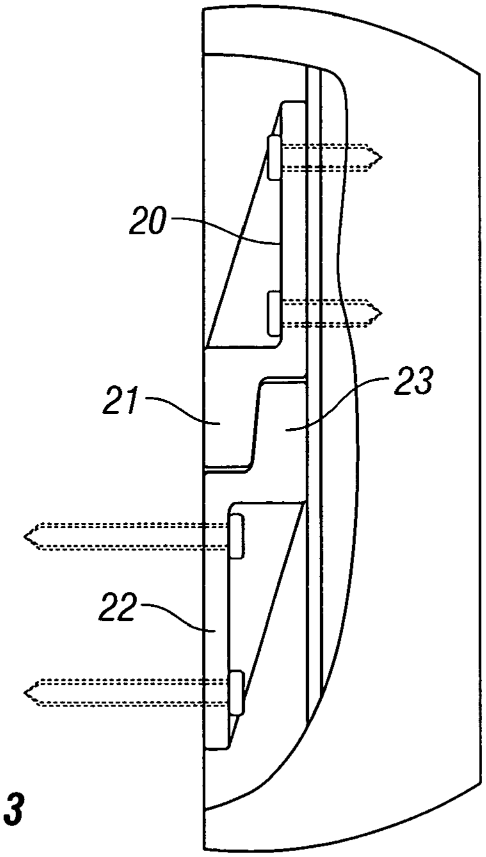
FIG. 3 is an enlarged side view of a portion of FIG. 1 indicated as a circle 3 in FIG. 1.
Figure 7:
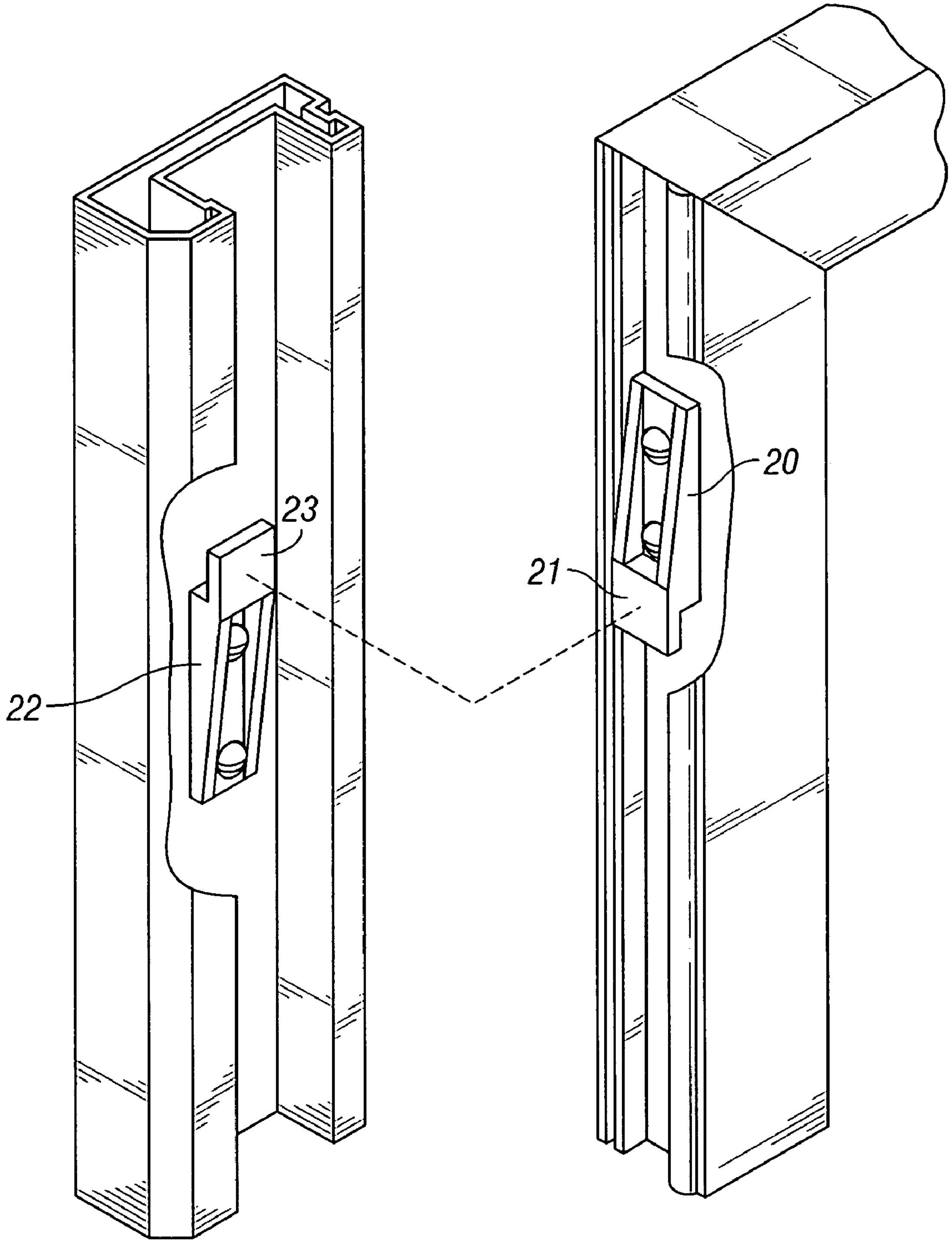
FIG. 7 is an enlarged exploded perspective view showing, on the right (and rotated out of the page with respect to the position of FIG. 1), a lower bracket of the door section of FIG. 1 and showing, on the left (and rotated out of the page with respect to the position of FIG. 1), an upper bracket of the sliding door frame of FIG. 1 in a disengaged position.

Frame 16 has a side edge 17 which has a second bracket or brackets 22 (or lower bracket) screwed, bolted or otherwise affixed thereto. As best shown in FIGS. 3 and 7, each upper bracket 20 has a lower engaging tab 21 which, when on the side edge of the door section 10 that is connected to the frame 16, couples to an upper engaging tab 23 of each lower bracket 22, preferably providing a relatively snug and secure fit. A second set of upper and lower brackets 20, 22, respectively, may be provided on door section side edge 18 and the frame side edge 17, as shown in FIG. 1.

The bracket system makes installation of door section 12 to the sliding door frame 16 relatively fast, easy, and secure. At the same time, door section 12 can be removed easily too. For helping to provide a "clean" or aesthetically pleasing installation, a top edge 27 of door section 12 has a vertical section 26 integral or unitary with top edge 27 of the door section. Also on top edge 27 is a resilient mechanism, e.g., two spring clips 30, for engaging the underside 29 of the top of the door frame 16. (See also, FIGS. 18 and 19) This engagement by using the resilient mechanism (spring clips 30) accommodates differences in the height opening of the sliding door frames, and thus is one way the door section is more universal.

Vertical section 26 is optional. It is preferred because it helps hide any size differences between the door section and sliding door frame. Vertical section 26 conceals the spring clips too. Further, it preferably will help seal the door section to the door frame, and thus may be made of a resilient plastic or be of a thickness such that the vertical section is resilient. The vertical section may also be cut down by the user during installation for a better fit, if necessary.

Frame 16 of door section 12 has a rectangular shape. In a preferred embodiment, top and bottom cross members 40, 42, respectively, of the rectangle, and two side vertical members 44, 44, all have mitered ends 40*a*, 42*a*, and 44*a*, 44*a*, respectively. The top and bottom cross members 40, 42 and the side members 44, 44, are all plastic (preferably vinyl) tubing. In a most preferred embodiment, the members 40, 42 have a C-shaped section (FIG. 11) and members 44, 44 have an H-shaped section (FIG. 12).

Figure 18:
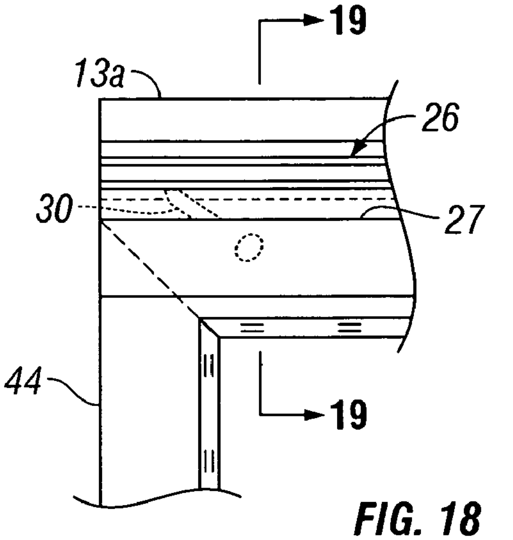
FIG. 18 is an enlarged side view of a portion of the door section of FIG. 1 in a circle 18 of FIG. 1.
Figure 19:
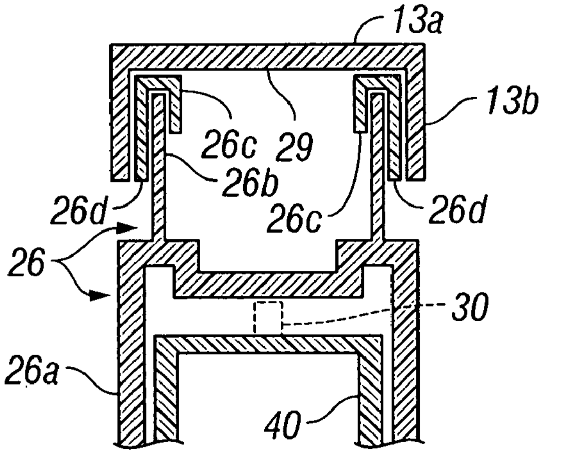
FIG. 19 is a vertical sectional view of a portion of FIG. 18 taken along a line 19-19 of FIG. 18.

As shown in FIGS. 18 and 19, vertical section 26 has a substantially H-shaped cross section and its lower half 26*a* will slide over top cross member 40. The vertical separation between the top of cross member 40 and vertical section 26 is caused by spring clips 30. Vertical section 26 has an upper half 26*b* which is slightly inset from lower half 26*a*, and has a series of horizontal indentations 26*d* forming break-offs. Another optional piece, is an inverted J-shaped element 26*c* which is preferably the same length as the H-shaped vertical section 26, which has a length that preferably is the same as the width of door section 12 (distance between its left and right side edges). Each inverted J-shaped element 26*c* may be slid on or placed on top of the upper half 26*b*, essentially hooked thereon so as to be help remove any space between sides 13*b* of top 13*a* of the door frame 13. If vertical section is too high for the door frame, break-offs may be removed from the vertical section to fit.

Figure 13:
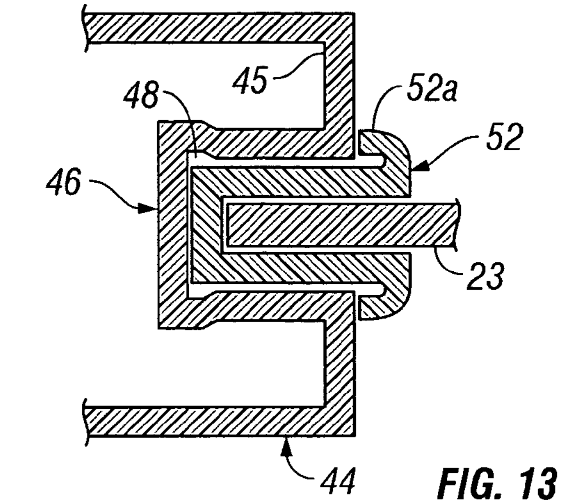
FIG. 13 is a horizontal sectional view taken along a line 13-13 of FIG. 1.

The members 44 have an inside face 45 which faces into the interior of the door section's frame. There is a recess 46 running the length of the face 45, and which has a slightly enlarged interior portion 48. The recess 46 receives three different parts. First, it receives a plastic or rubber C-channel 52 which holds edges of glass pane 23 (FIGS. 1 and 13). The C-channel preferably is sized to snugly receive the glass and to snugly fit in recess 46. C-channel 52 also preferably has outwardly projecting curved legs 52*a* which fold back to form a flush or clean look with face 45 of members 44.

It is noted that top cross member 40 may be formed so as to have the inner recess 46 so that another C-section 52 can fit in the recess and secure the top edge of glass 23. The bottom edge of glass 23 could also be secured the same way, by forming an intermediate cross member 60 the same as the top member 40 and using the upper channel 41 of the top member 40 (FIG. 11) to receive a strip of C-section 52 and thereby hold the bottom edge of the glass securely and with an excellent seal and insulation against the elements. The glass is preferably dual pane for insulation.

Figure 5:
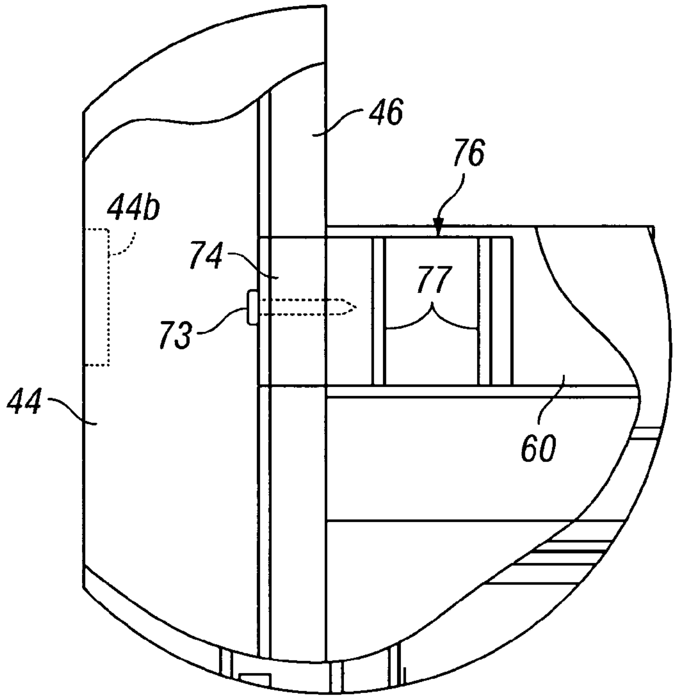
FIG. 5 is an enlarged side view of a portion of FIG. 1 indicated as a circle 5 in FIG. 1.
Figure 6:
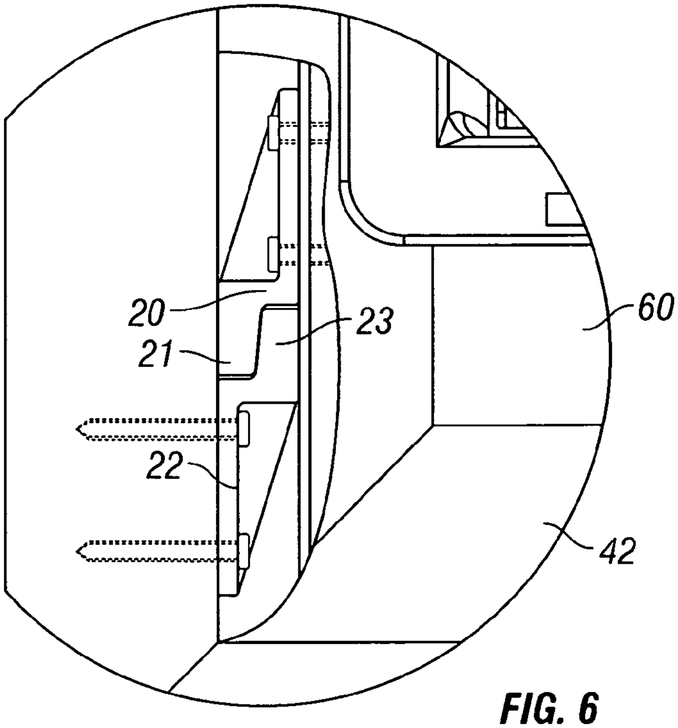
FIG. 6 is an enlarged side view of a portion of FIG. 1 indicated as a circle 6 in FIG. 1.

Last, recess 46 holds a tab end 74 of a first fitting 76 (FIGS. 5 and 12). The tab end 74 has two flanges 74*a* for fitting in an enlarged interior portion 48 and also has four ribs 75 (two on each side) for snugly fitting into recess 46. The first fitting 76 also has an enlarged rectangular section 79 which fits snugly into cross member 60 due to four ribs 80 on section 79. Section 79 also has a bottom wall 79*a* with screw holes 79*b* for being secured in the cross member 60. Fittings 76 may be slid up and down in recess 46. This allows easy assembly of door section 12.

Preferably, tab end 74 has a slight projection or is slightly longer in the vertical direction (lengthwise direction of recess 46 in side member 44), so that when the first fitting 76 is inserted in each side of the (intermediate) cross member 60, the fitting will stop entering the cross member by the tab end engaging the periphery of the cross member 60. This is very helpful for further fixing the fitting 76 to the side member 44 by applying a screw 73 into the tab end of the fitting. The screw 73 is accessed by an opening 44*b* in the outside side of the side member. When turning the screw using, e.g., a screw driver, fitting 76 will have a tendency to be pushed into cross member 60 so the extra length or projection of tab end 74 of fitting 76 will positively stop that tendency.

Figure 2:
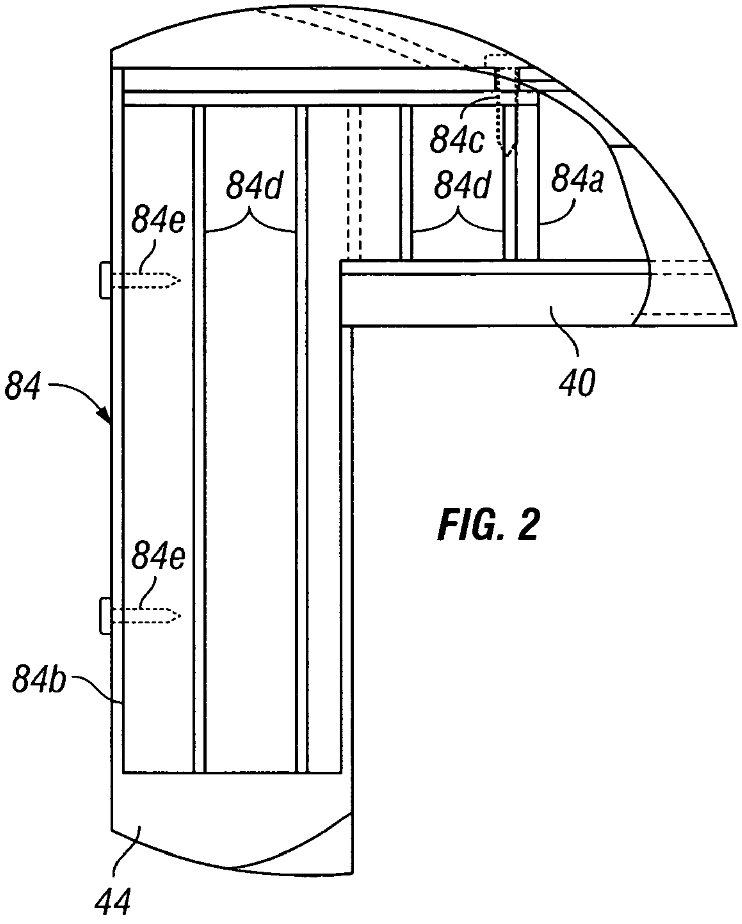
FIG. 2 is an enlarged side view of a portion of FIG. 1 indicated as a circle 2 in FIG. 1.
Figure 11:
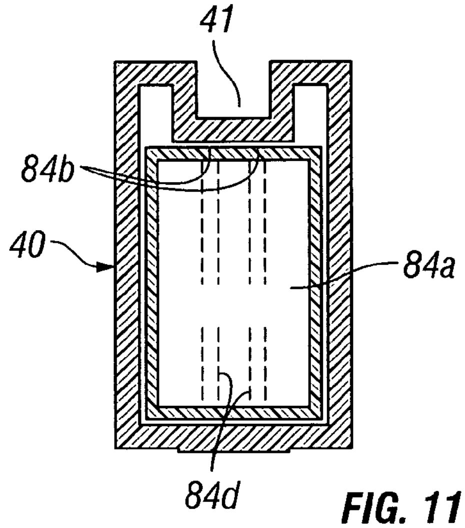
FIG. 11 is a vertical sectional view of the top member of FIG. 1 taken along a line 11-11 of FIG. 1.
Figure 12:
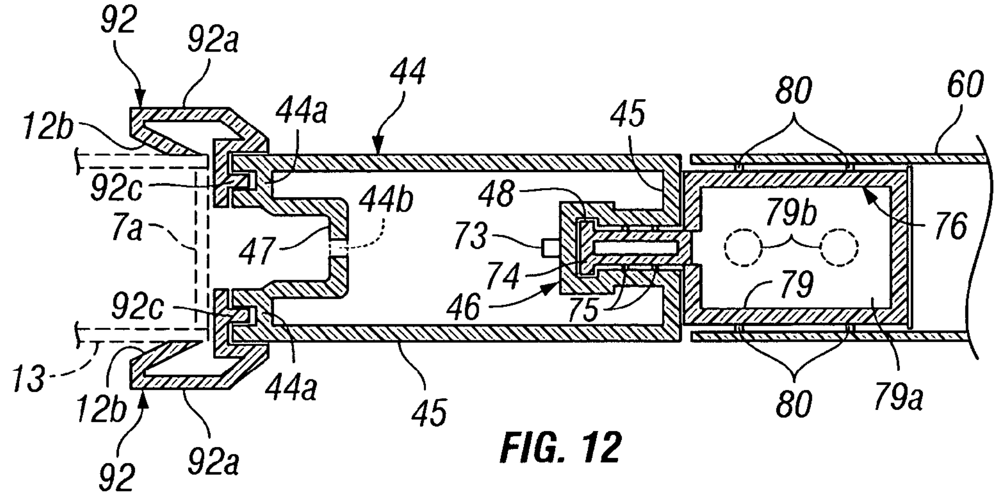
FIG. 12 is a horizontal sectional view taken along a line 12-12 of FIG. 1.

Side members 44 and top cross member 40 (and the side members 44 and bottom cross member 42) fit together preferably as shown in FIGS. 1, 2 and 11. There is a second fitting 84 which has an L-shape and may be essentially a rigid plastic rectangular L-shaped prism or an upside down C-shape with reinforcing ribs 84*b* on top and ribs 84*d* on its sides for a snug fit. It may also have screw holes (e.g., two) 84*c* on top and 84*e* on the side for being fixed to the top cross member 40 and the side member 44 at its long leg 84*b* of the second fitting 84. There may be more ribs, e.g., two running vertically along the outer face 84*e* of the long leg 84*b* of the second fitting, which will fit snugly into the center chamber 45 of the vertical member 44 (see FIGS. 12 and 2). Note that FIG. 12 shows the section view from FIG. 1 only through one side member, the fitting 76 and part of the cross member 60. The other end of the cross member, fitting on the other side and other side member would simply be a mirror image.

Generally, the fittings provide a strong and inexpensive way to fit the cross members and side members together, so that the cross and side members may be simply constructed, e.g., as tubes that are extruded. By contrast, the fittings are relatively small and may be injection molded much more easily than the cross members.

The ribs on the fittings may run horizontally, vertically or at an angle, e.g., forty five degrees.

Figure 4A:
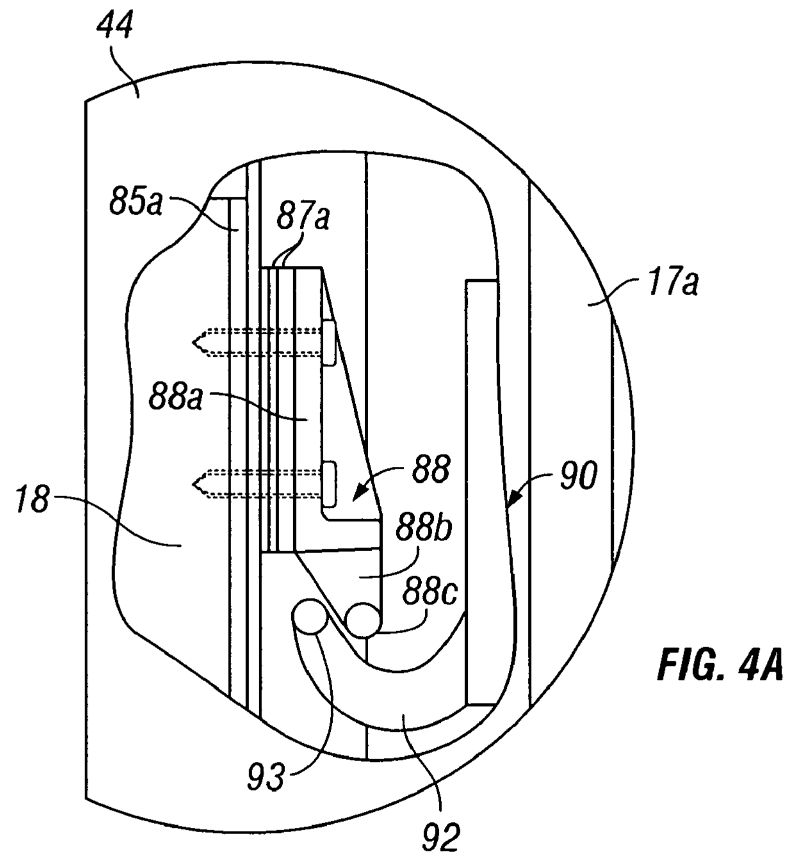
FIG. 4A is an enlarged side view of a portion of FIG. 1 indicated as a circle 4A in FIG. 1 showing a locking bracket on the door section of FIG. 1 and a sliding door lock engaging the bracket when in a locking position.
Figure 4B:
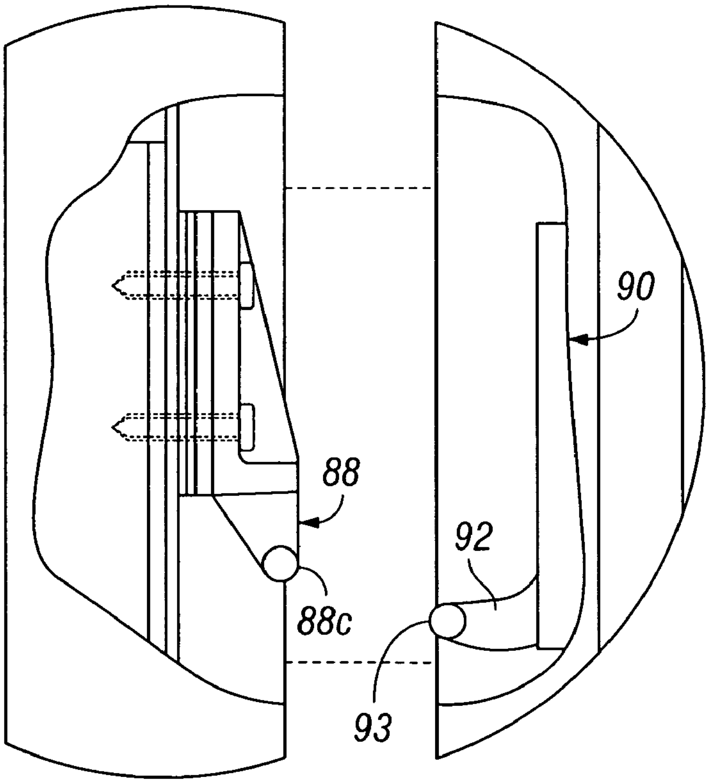
FIG. 4B is a view of the locking bracket and lock of FIG. 4A when the sliding door is open and the locking bracket and lock are disengaged.

Door section 12 also preferably has a locking bracket 88 with a flange 88*a* where it is affixed by screws to the outside edge 18 in the channel 47 of the H-shaped section of vertical member 44 (see FIGS. 4A, 1 and 12). Bracket 88 has two lower flanges 88*b* which support a rod section 88*c*. Existing lock 90 having a locking arm 92 with a hook end or rod end 93 will engage the rod section 88*c* and thereby lock the existing sliding door 13 with its existing lock to the door section 12. Some sliding doors have a double hook, so a second bracket 88 is preferably provided with the door for such situations.

As shown in FIG. 4*a*, the side members 44 preferably each have a metal (e.g., steel) reinforcement plate 85*a* disposed therein, e.g., located inside each of the extruded side members. The reinforcement plate 85*a* provides a strong anchor for the bracket 88, especially if one pulls or pushes on the sliding door 13. The reinforcing plate may be located in the area of just the bracket (and second bracket, if needed), a greater amount of the side members 44, or the length of the side members 44. If desired, reinforcing can be placed in the top and bottom cross members and/or other cross members too.

To adjust the projection of bracket 88 to fit depending on the latch hook 93, shims 87*a* may be provided, as shown in FIG. 4A.

A second cross member 60 may be positioned resting on top of the bottom cross member 42 (see FIG. 1) for providing a greater rise before pet door 2 is installed into the assembly. Alternatively, because the first fittings are slidable in the inner recesses of the vertical members 44, the rise of the pet door 2 may be custom selectable to a lower setting by putting second cross member 60 into the assembly first, then fixing the pet door to the assembly. In that structure, the two cross members 60 would be adjacent one another. An additional cross member 60 may be provided for further adjustability.

As shown in FIG. 12, a substantially G-shaped elongate vertical weather-stripping member 92 may have a rigid J portion 92*a*, a flexible sealing strip 92*b*, and a flange 92*c* that fits into a groove 44*a* in the outer and inner edges of the vertical member 44. These weather-stripping members seal around sliding door 13, with the flexible strip 92*b* providing room for accommodating doors of different thicknesses.

Preferably, the vinyl which the door is made of is PVC. However, other rigid plastics may be used. Softer or more rubbery plastics may be used for the strip 92*b*, the weather-stripping 67 and the C-shaped glass receiving channel 52.

Figure 20:
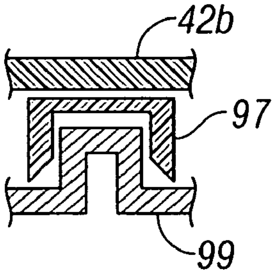
FIG. 20 is a vertical sectional view of a portion of FIG. 1 taken along a line 20-20 of FIG. 1.

In FIG. 20, in a further preferred embodiment, there is shown a mechanism to provide a snug friction fit of the door section 12 to a bottom track or rail 99 of the sliding door frame 13. A rubber or rubbery plastic element 97 shaped substantially as an inverted U is placed over the rail 99 and a bottom section 42*b* of bottom cross member 42 of door section 12 then sits on the element 97. This provides friction and snugness, so that the door section does not wiggle in and out at the bottom. Element 97 may be the entire length of bottom cross member 42, or just part thereof, or may be formed in multiple pieces.

All of the components may be a rigid plastic such as PVC, except for the softer or more rubbery plastic portions of weather-stripping and the like as noted above.

Pet Door Embodiments

Figure 8:
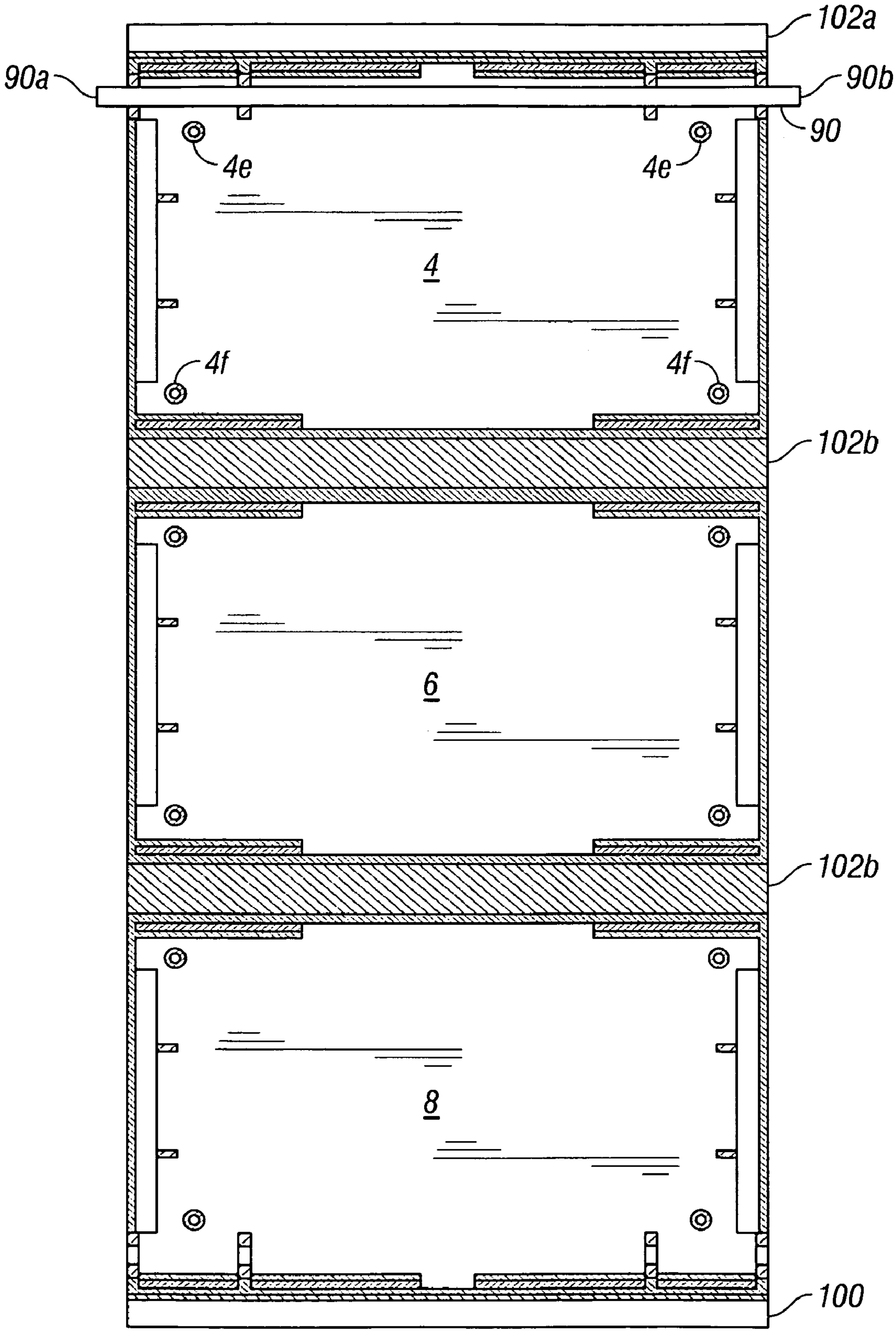
FIG. 8 is an enlarged front elevation view of the door section of FIG. 1.
Figure 9:
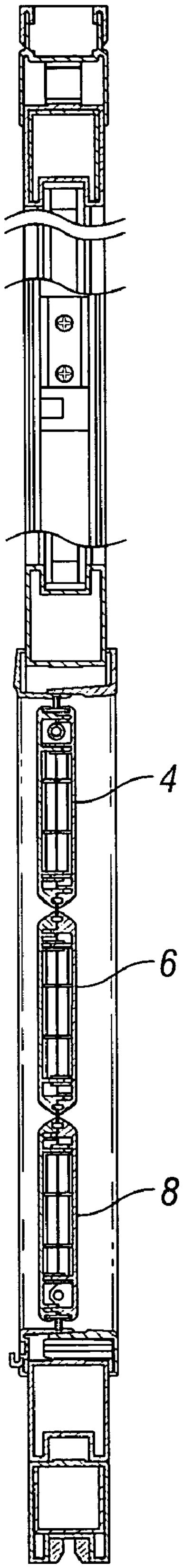
FIG. 9 is an enlarged partial side sectional and partial side elevation view of the door section and pet door taken along the line 9-9 of FIG. 1.
Figure 10:
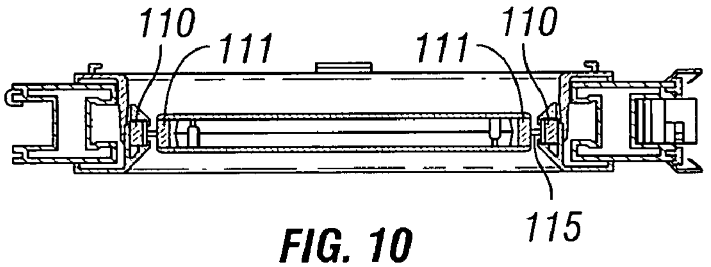
FIG. 10 is a vertical sectional view of the door section and pet door taken along a line 10-10 of FIG. 1.

The pet door 2 of the door section 12 may be a multiple panel pet door as shown in FIG. 1, and also FIGS. 8-10. FIGS. 15A, 15B, 16 and 17 show essentially the same door, except that the weather stripping is integral with the pet door. The door may be installed in a wall or other location too and is not limited to the screen.

Figure 16:
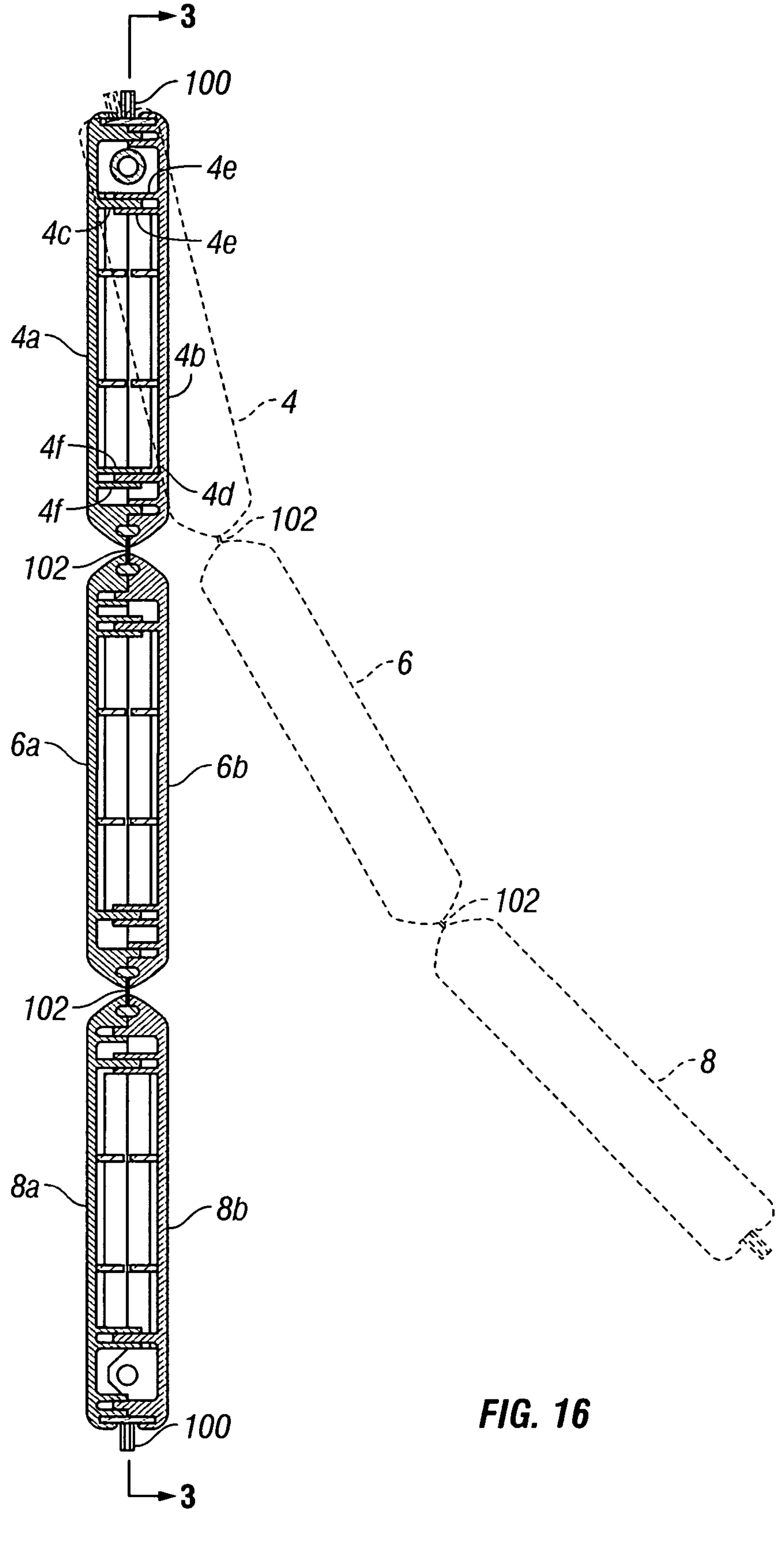
FIG. 16 is an enlarged side sectional view of three panels of the pet door of FIG. 15A.

As shown in FIG. 8, pet door 2 has multiple panels, e.g., three panels 4, 6, 8, top, middle and bottom panels, respectively. Top panel 4 hangs from a rod 90 whose ends 90*a*, 90*b* fit in the holes 72 in each strip 66. Each panel is constructed preferably as a two piece clam shell of rigid plastic (e.g., PVC) by first and second halves 4*a*, 4*b*, 6*a*, 6*b*, and 8*a*, 8*b*, as best shown in FIG. 16. The top and bottom panels 4 and 8 may be molded the same or essentially the same in a three panel (or more) pet door. In the top panel 4 and bottom panel 8, there is a piece of weather stripping 102*a* made of a soft plastic or rubber material fastened into the clam-shell and/or epoxied in place. The clam shell halves may each be held together by a friction fit, such as by posts 4*c*, 4*d* fitting snugly in cylindrical openings 4*e* and 4*f*, respectively. The same structure is used in all the panels for the clam shell. Epoxy can be used, but preferably the halves are sonic welded.

The middle panel 6 is mounted to the top panel, and also mounted to the bottom panel, by soft plastic or rubber weather stripping 102*b*, which is press fitted in notch and held also by the clam shell closure thereon. Any additional intermediate panels (in a door having more than three panels) preferably would be constructed the same as middle panel 6.

The weather stripping 102*b* functions not only as an insulator, but also as a hinge between the panels 4, 6 and 6, 8, such that when an animal, e.g., a dog passes through the door, the panels bend with respect to each other (see FIG. 16), and thus are not likely to injure the dog or cause the dog to get stuck in the door.

Figure 15A:
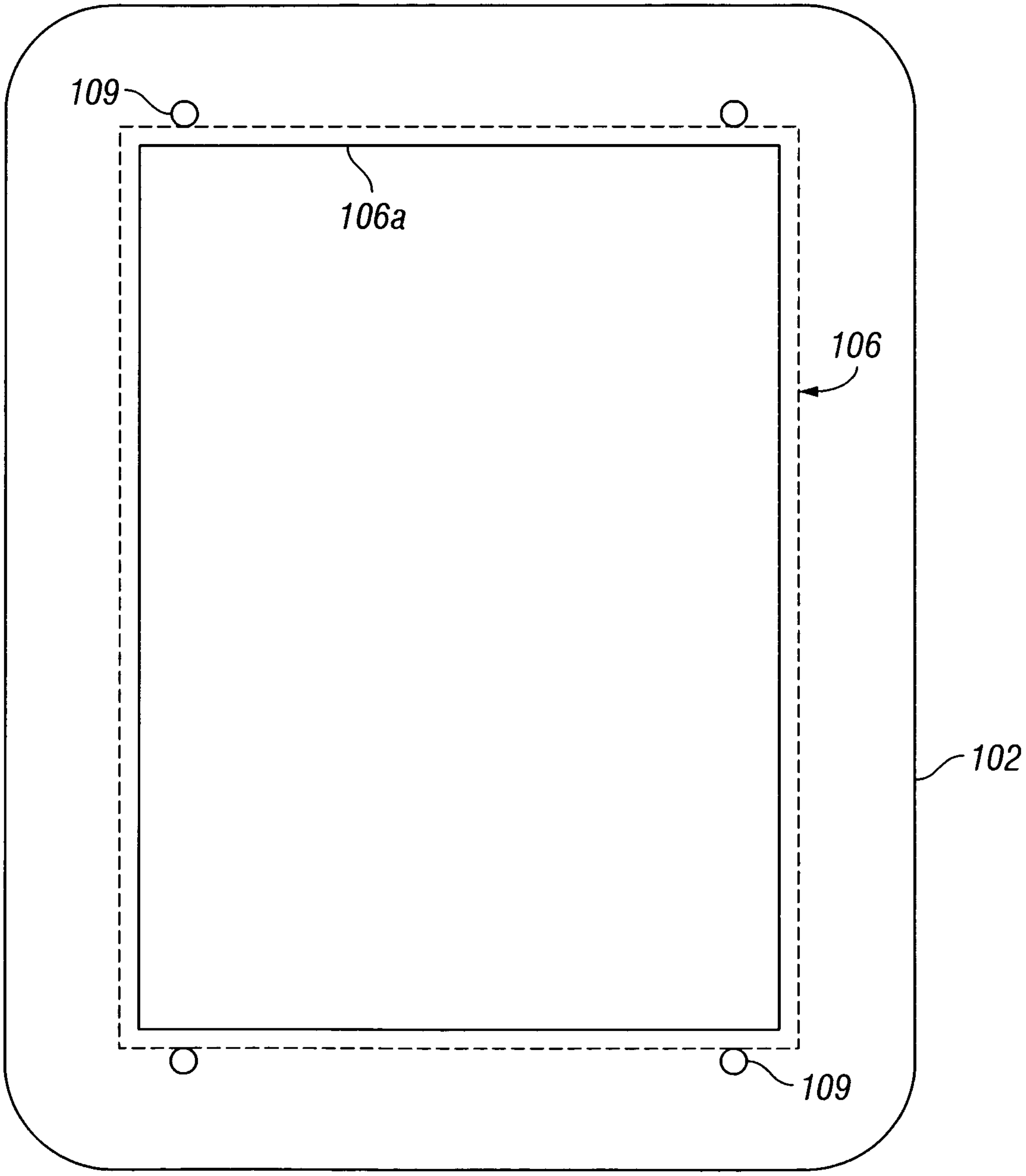
FIG. 15A is a side elevation view of an inside of an outer half portion of the pet door of a type similar to that used in the door section of FIG. 1.
Figure 15B:
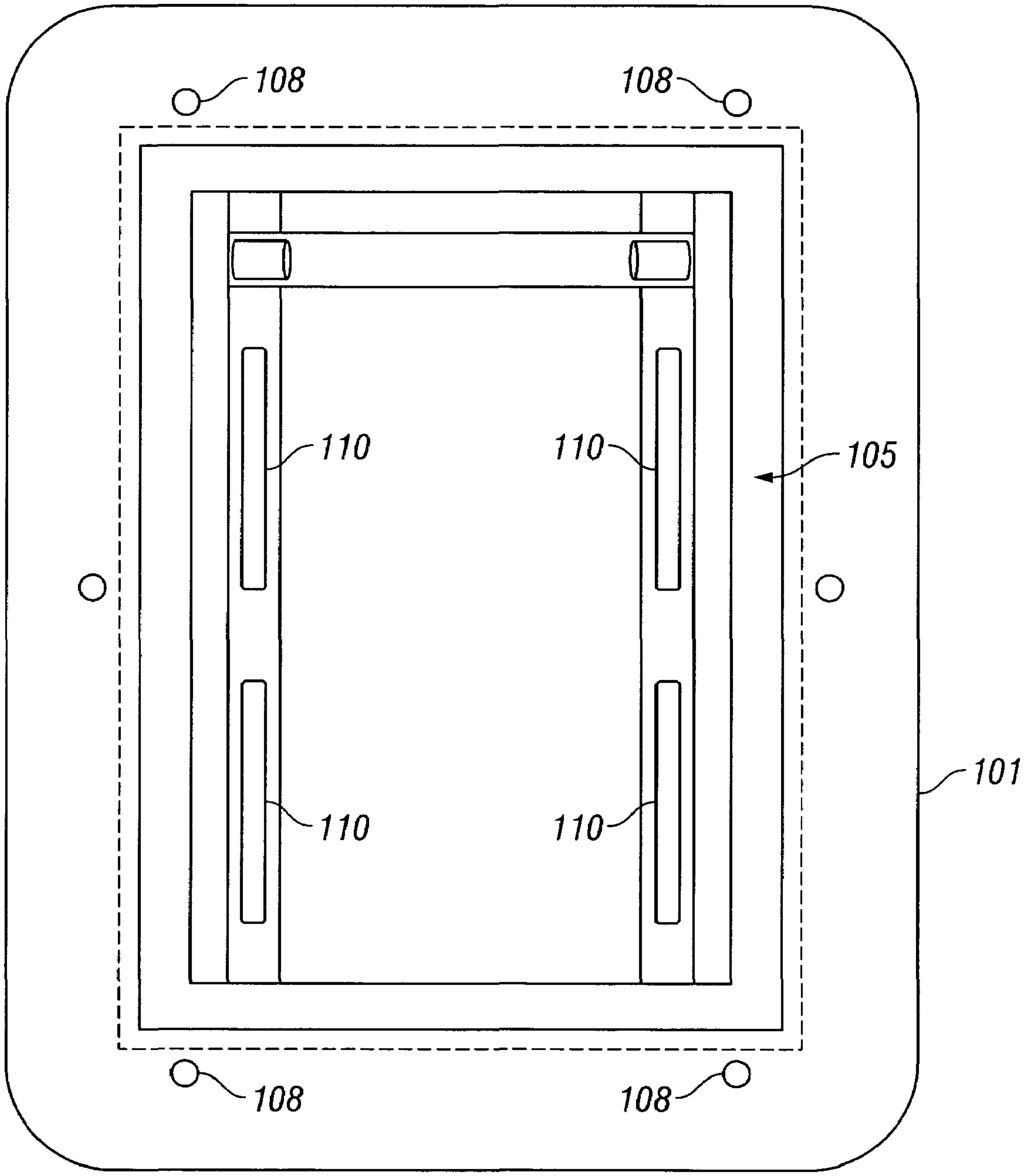
FIG. 15B is a side elevation view of an inside of an inner half portion of the pet door in the door section of FIG. 15A.

As shown in FIGS. 15A, 15B and 16, the frame of the pet door 2 may be formed in two different pieces, e.g., a rear or outer half 101, and a front or inner half 102 which each clam shell together. A first rectangular projecting wall 105 on outer half 101 fits around a second rectangular projecting wall 106 on inner half 102 so as to telescope, i.e., the amount of overlap of walls 105, 106 can be set to match the door or installation wall's thickness. Therefore, the pet door can have a thin profile or a thicker profile (depth). For example, the pet door 2 could fit in a storm door's lower panel, a five-eighths (⅝") thick single pane glass patio door, or a French door side lite, e.g., by using a frame kit. Wall 105 could go inside wall 106.

After fitting the halves into the rectangular opening in the door section 12 (or in the wall, etc.), the halves are screwed together. Screws (not shown) would pass through screw holes 108 into hollow posts 109. Magnets 110 such as rare earth magnets are mounted on the piece 101 opposite the side edges of the middle and bottom panels 6, 8, which have magnets 111 mounted in grooves along the side edges as shown in FIG. 10. The magnetic attraction of magnets 110 to magnets 111 helps the pet door return to its centered position. A strip of insulation 115 may extend for the length of the pet door and is mounted on the inner wall of the frame, so that the door will be weather proof.

Locking panel 140 of FIG. 17 slides in between overhanging tabs 142 (on each side of inner half 102) forming channels for the panel. As shown in FIGS. 17 and 17A, spring loaded locking handle 144 is biased into the locking position, but unlocks when movable tab 144*b* is squeezed (rotated in the direction of arrow A) toward a fixed tab 144*b* on the handle. In response to the squeezing action, a tongue 144*c*, responsive to, or integral or unitary with movable tab 144*a*, rotates in the direction of arrow B away from a corresponding lip or portion 106*a* of the wall 106, thereby allowing the panel 140 to be removed by pulling vertically upward while squeezing the tabs.

The pet door of the invention provides a very good seal and insulation, as most door panels are a single thin flap of soft plastic. Instead, in the present invention, the flap is made of multiple two piece sections which thus insulate well, with insulation forming the hinges too. Other mechanisms to form the hinges between panels of the multi-panel door may be used. The hinges bend or rotate clockwise and counterclockwise, depending on whether the pet (dog, cat, etc.) is entering or leaving. The use of insulation or other flexible strip of material is preferred as a hinge because it is very easy to rotate or bend. Traditional hinges could be used, although these generally have more friction, less insulation, and more wear due to weather. Other hinge mechanisms may be used as well.

It is also possible to mold or form the panels unitary or integral with each other, with a thin section of plastic or rubbery plastic connecting each panel. The panels are preferred to a traditional flap of flexible material because the panels provide much greater insulation, having an air gap (or other insulation) therein. In the preferred embodiment, the panels are injection molded and Lexan® plastic (polycarbonate plastic) made by GE is used.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A door section for fitting into a door frame for a sliding door, the door section comprising:

i) a rectangular frame formed by two side members, a top cross member, and a bottom cross member, the rectangular frame having four corners;

ii) each of the side members, top cross member and bottom cross member being formed as a rigid plastic tube;

iii) fittings at each of the four corners, each fitting having a first portion fitting inside one side member and a second portion fitting inside one of the top cross member and bottom cross member;

iv) a pet door located between the side members and proximate the bottom cross member; and v) structural means extending above the pet door and extending between the side members and the top member for closing off space between the side members, top member and pet door, wherein the structural means comprises an intermediate plastic cross member proximate the pet door and a panel.

2. The door section of claim 1, wherein the panel comprises a clear material.

3. The door section of claim 1, wherein the panel comprises glass.

4. The door section of claim 1, wherein the intermediate cross member comprises a plastic tube.

5. The door section of claim 1, further comprising another intermediate panel located between the door member and the bottom cross member.

6. The door section of claim 1, wherein there is a further fitting at each end of the intermediate panel, each further fitting having a first end fitting in the intermediate section and a second end slidably fitting within the side member.

7. The door section of claim 6, further comprising means for securing the fittings to the side members and top and bottom cross members, and the further fittings to the side members.

8. The door section of claim 7, wherein the means for securing comprises screws.

9. The door section of claim 1, further comprising a resilient mechanism on the top cross member for vertical resiliency.

10. The door section of claim 1, further comprising brackets on at least one of the side members.

11. The door section of claim 1, further comprising a latch engaging member on one of the side members.

12. The door section of claim 1, further comprising an H-shaped member on top of the top member.

13. The door section of claim 1, further comprising an H-shaped member on top of the top member, wherein the H-shaped member has break-off sections for changing a height thereof.

14. The door section of claim 1, wherein there is weather stripping along a side member of the door section.

15. The door section of claim 1, wherein the fittings have ribs on exterior surfaces thereof for slidably mating with interior surfaces of the side members and top members.

16. The door section of claim 1, wherein the side members have recesses along an inner side thereof for receiving side edges of the panel.

17. The door section of claim 16, wherein there is a C-shaped rubbery section for friction fitting in the recess and friction fitting the side edges of the panel.

18. The door section of claim 17, wherein the C-shaped rubbery sections extend outside of the recess and have curved legs for providing a curved transition between a surface of the panel and the side members.

19. The door section of claim 1, wherein the plastic comprises PVC.

20. A door section for fitting into a door frame for a sliding door, the door section comprising:

i) a rectangular frame formed by two side members, a top cross member, and a bottom cross member, the rectangular frame having four corners;

ii) each of the side members, top cross member and bottom cross member being formed as a rigid plastic tube;

iii) fittings at each of the four corners, each fitting having a first portion fitting inside one side member and a second portion fitting inside one of the top cross member and bottom cross member;

iv) a pet door located between the side members and proximate the bottom cross member; and v) structural means extending above the pet door and extending between the side members and the top member for closing off space between the side members, top member and pet door, further comprising a resilient mechanism on the top cross member for vertical resiliency.

21. A door section for fitting into a door frame for a sliding door, the door section comprising:

i) a rectangular frame formed by two side members, a top cross member, and a bottom cross member, the rectangular frame having four corners;

ii) each of the side members, top cross member and bottom cross member being formed as a rigid plastic tube;

iii) fittings at each of the four corners, each fitting having a first portion fitting inside one side member and a second portion fitting inside one of the top cross member and bottom cross member;

iv) a pet door located between the side members and proximate the bottom cross member; and v) structural means extending above the pet door and extending between the side members and the top member for closing off space between the side members, top member and pet door, further comprising an H-shaped member on top of the top member.

22. A door section for fitting into a door frame for a sliding door, the door section comprising:

i) a rectangular frame formed by two side members, a top cross member, and a bottom cross member, the rectangular frame having four corners;

ii) each of the side members, top cross member and bottom cross member being formed as a rigid plastic tube;

iii) fittings at each of the four corners, each fitting having a first portion fitting inside one side member and a second portion fitting inside one of the top cross member and bottom cross member;

iv) a pet door located between the side members and proximate the bottom cross member; and v) structural means extending above the pet door and extending between the side members and the top member for closing off space between the side members, top member and pet door, further comprising an H-shaped member on top of the top member wherein the H-shaped member has break-off sections for changing a height thereof.

23. A door section for fitting into a door frame for a sliding door, the door section comprising:

i) a rectangular frame formed by two side members, a top cross member, and a bottom cross member, the rectangular frame having four corners;

ii) each of the side members, top cross member and bottom cross member being formed as a rigid plastic tube;

iii) fittings at each of the four corners, each fitting having a first portion fitting inside one side member and a second portion fitting inside one of the top cross member and bottom cross member;

iv) a pet door located between the side members and proximate the bottom cross member; and v) structural means extending above the pet door and extending between the side members and the top member for closing off space between the side members, top member and pet door, wherein the fittings have ribs on exterior surfaces thereof for slidably mating with interior surfaces of the side members and top members.

24. A door section for fitting into a door frame for a sliding door, the door section comprising:

i) a rectangular frame formed by two side members, a top cross member, and a bottom cross member, the rectangular frame having four corners;

ii) each of the side members, top cross member and bottom cross member being formed as a rigid plastic tube;

iii) fittings at each of the four corners, each fitting having a first portion fitting inside one side member and a second portion fitting inside one of the top cross member and bottom cross member;

iv) a pet door located between the side members and proximate the bottom cross member; and v) structural means extending above the pet door and extending between the side members and the top member for closing off space between the side members, top member and pet door, vi) wherein the side members and the top and bottom cross member each have a C-shaped section, defining recesses therein, and the structural means comprises a glass panel fitting in the recesses of the side members and top cross member.

25. The door section of claim 24, further comprising an intermediate cross-member for receiving a bottom edge of the glass, and the pet door being disposed between the intermediate cross-member and the bottom cross member.

* * * * *